(No Model.)
G. W. CARY.
WAGON BRAKE.
No. 346,723. Patented Aug. 3, 1886.
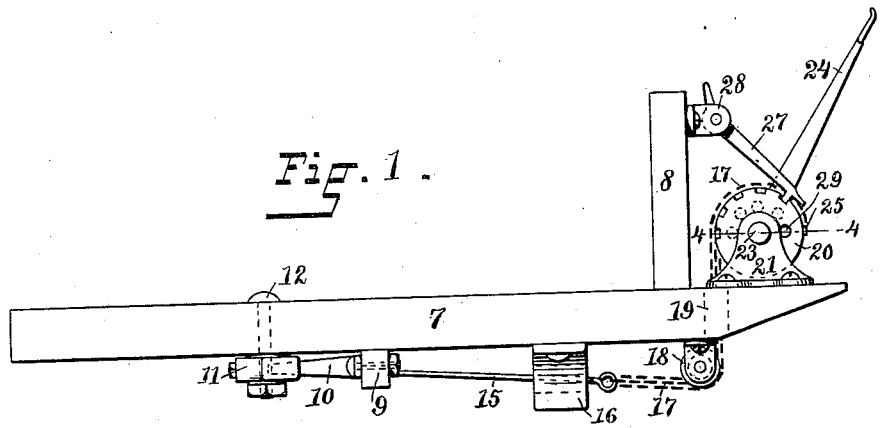
Fig. 1.
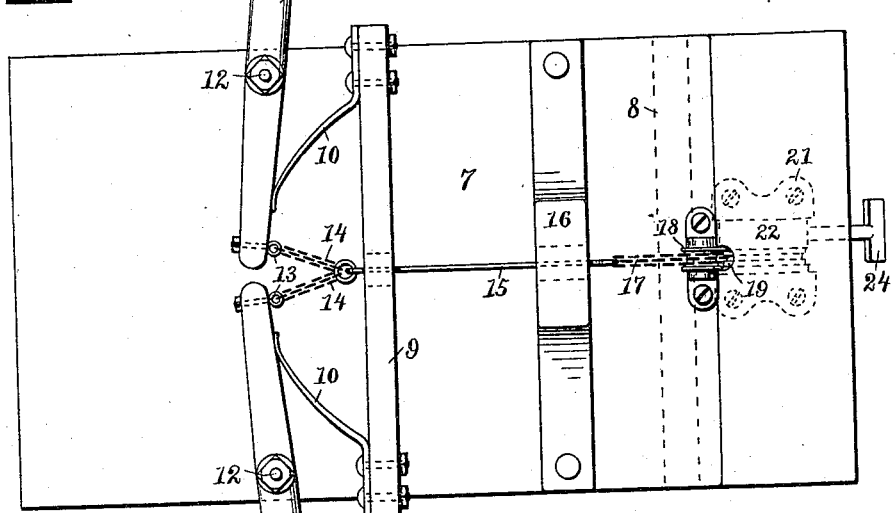
Fig. 2.
Fig. 3.
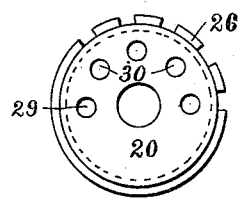
Fig. 4.
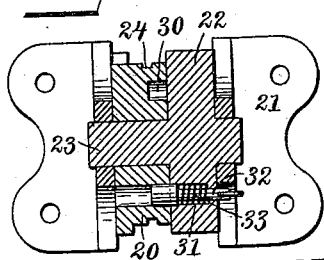
WITNESSES:
Chas. H. Luther Jr
Willis Fowler
INVENTOR:
George W. Cary
By Joseph A. Miller & Co
Attys
N. PETERS. Photo-Lithographer, Washington, D. C.

UNITED STATES PATENT OFFICE.

GEORGE W. CARY, OF PROVIDENCE, RHODE ISLAND, ASSIGNOR TO EARL CARPENTER & SONS, OF SAME PLACE.

WAGON-BRAKE.

SPECIFICATION forming part of Letters Patent No. 346,723, dated August 3, 1886.

Application filed May 14, 1886. Serial No. 202,130. (No model.)

*To all whom it may concern:*

Be it known that I, GEORGE W. CARY, of the city and county of Providence, and State of Rhode Island, have invented certain new and useful Improvements in Wagon-Brakes, of which the following is a full, clear, and exact description, reference being had to the accompanying drawings, forming part of this specification.

My invention relates to brakes used with vehicles, and ordinarily known as "wagon-brakes," which are used for the well-known purpose of putting friction on the wagon-wheels to check or impede the rotation thereof.

The objects of my invention are to provide an efficient brake, which has a positive and firm action and a peculiar take-up device, and a controlling ratchet and pawl, whereby the brake can be rigidly set at any point of its movement.

To the above purposes my invention consists in the certain novel construction and arrangement of the parts of the brake, as hereinafter fully described and claimed.

In the accompanying drawings, Figure 1 represents a side elevation of my brake mounted in operative position upon the bottom and head-board of an ordinary wagon-body. Fig. 2 represents an under side view of Fig. 1, with portions thereof shown in broken lines. Fig. 3 represents an enlarged broadside view of the chain-disk, detached. Fig. 4 represents a sectional view of the chain-disk, lever-disk, and the take-up device shown on line 4 4, Fig. 1.

In the said drawings like numbers designate corresponding parts throughout.

Referring to the drawings, 7 designates the bottom, and 8 the head-board, of an ordinary wagon-body. The cross-beam 9 is fastened transversely upon the under side of bottom 7, and the springs 10 are disposed one to each end thereof, and their free ends press against the rubber-levers 11, which are pivoted on bolts 12, set in bottom 7. The short arms of rubbers 11 project beyond the sides of bottom 7, and their long arms lie thereunder and are fastened by means of bolt-eyes 13 with chains 14, which in turn are connected with rod 15, which passes through openings in cross-bar 9 and frame 16, and at its other end is connected with chain 17. The chain 17 passes over guide-pulley 18 through an adjacent eye, 19, in bottom 7, and then is passed about the rim of chain-disk 20, where it is fastened to stud 25.

The chain-disk 20 is mounted loosely upon the turnable shaft 23, journaled in the upright pieces of stand 21, located on the upper side of bottom 7, near its front end. To the shaft 23, and to one side of chain-disk 20, is rigidly fixed the lever-disk 22, from the periphery of which extends the radial operating-lever 24, having a foot-piece or tread upon its free end. The perforation 19 passes transversely through the body of disk 22, at about midway between its circumference and its bearing on shaft 23. The perforation 19 is of two diameters, the larger looking toward the inner face and the smaller toward the outer face of disk 22. The pin 32 is nested in the perforation and has a spiral spring, 33, coiled about its shank, and which tends to keep the pin projecting out from the perforation toward the chain-disk, in the opposite face of which are disposed the sockets 30, which are arranged at equal distances from the center of the disk 20, and one of which is formed as a channel, 29, through the body of the disk, laterally. The pin 32, with its spring, is pushed in through the channel 29 and set into its perforation 19 in disk 22, so that its shank protrudes on the outer face thereof, where it is fastened with a ring or link, which is pulled on when it is desired to draw the pin 32 within its perforation in order to release disk 20 and turn it on its bearings to bring another socket, 30, before the pin which will slip in it and again lock the disks together.

The rim of chain-disk 20 is formed with a groove, 24, to track the chain 17, which passes around about one-half the circumference thereof, and is held firmly by the stud 25. A portion of the rim of the chain-disk is provided with the ratchet-cogs 26, which are engaged by the end of the gravity-pawl 27, pivoted on the fixed bracket 28, which is set on the face of head-board 8. This pawl and ratchet serve to control the chain-disk and its connected parts, as hereinafter explained.

Normally the rubber-levers are in the positions shown, and their connection with the chain-disk is drawn taut. The take-up device, consisting of the spring-acted pin 32 and socket 30, is then set so as to maintain the connection in normal position and to throw the operating-lever 24 in toward the head-board. It is obvious that when the operating-lever is forced out away from the head-board 8, the disks, being locked by the take-up device, will turn together on shaft 23 and pull on the chains, and will thus cause the rubber-levers to move in arcs, of which their pivotal points will be the centers, and will bear hard upon the wagon-wheels, about which they may be adjusted. The gravity-pawl 27 will operate in an evident manner to allow the ratchet-cogs to pass under it when the disk 20 is turning in a direction to put the brake on; but it will not permit a reverse motion, so that the brake may be firmly held at any position when operating to put friction on the wheels.

Of course the ordinary brake-shoes may be fixed upon the rubber-levers 11, and bear directly upon the wagon-wheels. When the rubbers or shoes wear away by constant friction on the wheels, the chain connection of the rubber-levers with the chain-disk becomes too slack to be efficiently used, and this slack may be readily taken up by means of the take-up device hereinbefore described.

The controlling ratchet and pawl for disk 20 may be changed by the use of a separate disk mounted beside the chain-disk in place of the combined way I have shown.

There may be various modifications made in the brake without substantially departing from the spirit of my invention.

Having thus described my invention, I claim as new and desire to secure by Letters Patent—

1. In combination, a lever-disk, a chain-disk, a take-up device for locking or releasing said disks relatively to each other, whereby they may be turnable together or independently, a ratchet and pawl controlling said chain-disk, a pair of rubber-levers, and a flexible connection fastened to said rubbers and to the rim of said chain-disk, whereby said connection may be wound on said rim, for the purpose described.

2. In combination, a lever-disk, a chain-disk provided with a peripheral ratchet, and a stationary pawl engaging therewith, a take-up device consisting of a spring-pressed pin set laterally through said lever-disk and engaging with sockets in the adjacent face of said chain-disk, whereby said disks may be locked or released and act together or independently, a pair of rubber-levers, and a partially-flexible connection between said rubbers and the rim of said chain-disk, whereby said rubbers may respond to the movements of said chain-disk, substantially as described.

3. In combination, a lever-disk provided with an operating-lever and rigidly mounted on a rotary shaft, a chain-disk loosely mounted on said shaft and provided with a controlling ratchet and pawl, a take-up device composed of a spring-acted pin set transversely in said lever-disk and engaging with sockets in the opposite face of said chain-disk, whereby said disks may be locked or released and turnable together or independently, a pair of spring-acted rubber-levers, and a partially-flexible connection fastened between said rubbers and the rim of said chain-disk, whereby said rubbers may respond to the movements of said chain-disk, substantially as described.

4. In combination, the loose chain-disk 20, the fast lever-disk 22, provided with operating-lever 24, both of said disks mounted on the rotary shaft 23, journaled in stand 21, the take-up device consisting of pin 32, set in perforation 31 in disk 22, and engaging with sockets 30, set in disk 20, and the rubber-levers suitably mounted and provided with the partially-flexible connection, said connection intermediate between said levers and a point on the rim of the chain-disk, substantially as and for the purpose described.

5. The combination, with the loose chain-disk 20, provided with ratchet-cogs 26 and sockets 30, the fast lever-disk 22, provided with the operating-lever 24 and the perforation 31, containing pin 32, and the pawl 27, pivoted on bracket 28 and engaging ratchet-cogs 26, of the rubber-levers 11, pivoted on bolts 12 and provided with springs 10, the connecting-chains 14 17, and rod 15 and guide-pulley 18, substantially as described.

GEORGE W. CARY.

Witnesses:
J. A. MILLER, Jr.,
M. F. BLIGH.